(12) United States Patent
Rousseau et al.

(10) Patent No.: US 7,862,327 B2
(45) Date of Patent: Jan. 4, 2011

(54) DEVICE FOR MOULDING THERMOPLASTIC CONTAINERS BY BLOW-MOULDING OR STRETCH BLOW-MOULDING

(75) Inventors: Nicolas Rousseau, Octeville sur Mer (FR); Laurent Danel, Octeville sur Mer (FR); Thierry Lemble, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 386 days.

(21) Appl. No.: 12/061,792

(22) Filed: Apr. 3, 2008

(65) Prior Publication Data

US 2008/0254160 A1 Oct. 16, 2008

(30) Foreign Application Priority Data

Apr. 10, 2007 (FR) .................................. 07 02597

(51) Int. Cl.
*B29C 49/12* (2006.01)
*B29C 49/36* (2006.01)
*B29C 49/58* (2006.01)

(52) U.S. Cl. .................. 425/529; 425/535; 425/540

(58) Field of Classification Search ............... 425/522, 425/529, 535, 540
See application file for complete search history.

(56) References Cited

U.S. PATENT DOCUMENTS

| | | | | |
|---|---|---|---|---|
| 3,871,856 A | * | 3/1975 | Trahan | 65/261 |
| 6,464,486 B1 | * | 10/2002 | Barray et al. | 425/535 |
| 6,736,625 B1 | * | 5/2004 | Linglet | 425/529 |
| 7,004,745 B2 | * | 2/2006 | Galloni | 425/529 |
| 7,165,956 B2 | | 1/2007 | Santais et al. | |
| 7,563,092 B2 | * | 7/2009 | Mie | 425/535 |
| 2004/0009257 A1 | * | 1/2004 | Galloni | 425/529 |
| 2007/0254061 A1 | | 11/2007 | Dannebey | |

FOREIGN PATENT DOCUMENTS

| | | |
|---|---|---|
| FR | 2 662 631 A1 | 12/1991 |
| FR | 2 848 905 A1 | 6/2004 |
| FR | 2 871 721 A1 | 12/2005 |
| FR | 2 876 942 A1 | 4/2006 |

OTHER PUBLICATIONS

French Preliminary Search Report dated Nov. 20, 2007.

\* cited by examiner

*Primary Examiner*—Robert B Davis
(74) *Attorney, Agent, or Firm*—Sughrue Mion, PLLC

(57) ABSTRACT

Device for moulding thermoplastic containers by blow-moulding hot preforms, comprising a mould (1) and blow-moulding means (2) comprising a bell nozzle (8) which is axially displaceable between a raised position and a blow-moulding position in abutment against the mould; the driving means comprising mechanical means (12) with a cam follower roller (13)/cam (14) and pneumatic means (16) with a piston (18) integral with the upper end of the nozzle and sliding in a fixed enclosure (17), defining therein an upper chamber (19) connected to a source (24) of control fluid and a lower chamber (20) connected to this source and to the upper chamber via a solenoid valve (26); the upper face of the piston has a surface area which is greater than that of its lower face and that of the bell (9) of the nozzle.

7 Claims, 4 Drawing Sheets

DEVICE FOR MOULDING THERMOPLASTIC CONTAINERS BY BLOW-MOULDING OR STRETCH BLOW-MOULDING

FIELD OF THE INVENTION

The present invention generally relates to the field of moulding containers, in particular bottles or the like, made of thermoplastic material such as PET, by blow-moulding or stretch blow-moulding hot preforms, and it relates more particularly to improvements made to the devices for moulding thermoplastic containers by blow-moulding or stretch blow-moulding hot preforms, said devices comprising a mould and blowing means comprising a blowing nozzle of the bell-nozzle type which is axially displaceable and driving means for displacing said blowing nozzle above said mould between a raised position in which the end of the nozzle is raised above the mould and a blowing position in which the end of the nozzle is in sealing abutment against the mould, which driving means comprise mechanical driving means including at least one cam follower roller integral with the nozzle and at least one respective control cam against which said cam follower roller is maintained in abutment, the cam follower roller and the cam being in relative movement.

BACKGROUND OF THE INVENTION

The moulding devices arranged as indicated above are currently marketed by the applicant and have been completely satisfactory in the conditions of use which have been in practice until now. However, these devices have several drawbacks.

A first drawback relates to the mechanical design of the means for driving the blowing nozzle, with the cam follower roller and the cam in relative displacement. The phenomenon of the rebound of the cam follower roller when it enters into contact with the cam causes vibrations which spread inside the device. It has been possible to control this rebound phenomenon by selecting appropriate structures, in particular return means, such that it has been possible for such an arrangement to be satisfactory up to high production speeds (for example in the order of 50,000 to 60,000 containers/hour) which are currently reached. However, to reach even higher production speeds (for example up to 80,000 containers/hour) which manufacturers would now like to achieve, these structural alterations are no longer able to be retained, in particular as regards the return springs of the cam follower rollers.

Furthermore, fluid, typically pneumatic, driving means may naturally be implemented to ensure the displacement of the blowing nozzle at least in one direction (typically the lowering of the nozzle). However, such pneumatic driving means consume high levels of pressurized gas (in practice air), in particular due to the discharge into the atmosphere, at the end of the step, of the gas which has carried out the operation. More specifically, the production of pressurized air constitutes a particularly costly stage within the installations concerned; in particular, the greater the quantity and/or the pressure of pressurized air, the more powerful the compressor has to be, whilst powerful compressors are very costly to purchase and consume high levels of electrical energy during operation.

Additionally, in the case where the nozzle is of the bell-nozzle type, the base of the bell of the nozzle is subjected to high pressure (typically in the order of $40 \times 10^5$ Pa for example) of the blowing gas. The resulting force which is directed upwardly, tends to detach the nozzle from the mould against which it has to be maintained in sealing abutment, which may cause malfunctioning, in particular faults in the seal of the abutment and leakages of blowing gas, during the blowing step. To avoid such a drawback, it is necessary to provide appropriate means so that the bell is tightly maintained in sealing abutment against the mould in spite of this unfavourable reaction and the appropriate arrangements prove, once again, costly.

SUMMARY OF THE INVENTION

The subject of the invention is specifically to remedy these drawbacks observed in practice and to propose an improved technical solution which allows by oneself to remedy simultaneously the two aforementioned drawbacks in spite of their being technically independent of one another.

To this end, the invention proposes a device for moulding thermoplastic containers by blow-moulding or stretch blow-moulding hot preforms as set forth in the preamble, which device, being designed according to the invention, is characterized in that the driving means further comprise pneumatic driving means which include:
- a fixed enclosure surrounding substantially coaxially an upper terminal section of the blowing nozzle,
- a piston enclosed in said enclosure and integral with the upper end of the blowing nozzle, said piston defining in the enclosure an upper chamber and a lower chamber, the piston having an upper face having a surface area greater than the surface area of the bell of the nozzle and a lower face having a surface area which is less than that of its upper face,
- an upper orifice provided in the enclosure and in communication with the upper chamber,
- a lower orifice provided in the enclosure and in communication with the lower chamber,
- the two upper and lower orifices being connected to a source of pressurized control fluid,
- a bypass circuit extending between the two upper and lower chambers, and
- selector means adapted for separating the lower orifice from, and connecting the lower orifice to, the atmosphere during the blow-moulding phase,
- the surface area of the upper face of the piston being such that the force exerted on the piston by the control fluid in the upper chamber is greater than the force in the reverse direction exerted by the blow-moulding fluid on the bell of the nozzle.

Due to the implementation of the means proposed by the invention, it is the mechanical driving means with the cam follower roller in abutment against the cam which determine the speed of displacement of the nozzle, whilst the pneumatic driving means is provided with the function of ensuring the maintenance of the cam follower roller in abutment against the cam during the displacement of the nozzle and the locking of the nozzle in abutment against the mould during the blow-moulding phase. The implementation of pneumatic means makes it possible to produce the high return force necessary for correct guidance, without rebound, of the cam follower roller and avoids the implementation of highly rigid springs of which the handling, in particular during assembly and disassembly, may prove dangerous for maintenance personnel.

Also, due to the implementation of the means proposed by the invention, it becomes easily possible that the pressurized fluid controlling the operation of the pneumatic driving means is not systematically discharged into the atmosphere at the end of each blow-moulding cycle and that, in particular, the dead volumes are reduced, thus making possible substantial savings in pressurized blowing fluid.

In one simple embodiment, it may be provided that the two upper and lower orifices are connected to the source of blowing fluid itself and that the upper face of the piston has a transverse dimension which is greater than the transverse dimension of the bell of the nozzle. The fact that the pneumatic cylinder is moved by the pressurized blowing fluid makes it possible, on the one hand, to simplify the pneumatic cabling of the blowing means and, on the other hand, to be able to provide the cylinder with a minimal transverse dimension since it is subjected to the same pressure as that being applied to the bell of the nozzle. However, the fact remains that it is the pressurized blowing fluid, of which the production is costly, which is used.

To avoid this drawback, alternatively it is possible to provide that the two upper and lower orifices are connected to a source of control fluid at a pressure which is lower than the pressure of the blowing fluid, in particular preferably a source of fluid at industrial pressure (typically in the order of $7 \times 10^5$ Pa) which is present in all the pneumatic installations.

Although this is not the only possible solution, advantageously it may be provided that the bypass circuit is outside the enclosure and incorporates a solenoid valve which is placed in the closed position during the blow moulding phase. Preferably, it is also possible to provide that the bypass circuit is inside the enclosure, and in particular extends between the enclosure and the piston, and that a circuit incorporating a solenoid valve is interposed between the source of control fluid and the lower orifice.

As may easily be understood according to the context, the arrangements according to the invention may be applied very advantageously to rotating carousel type installations, for the manufacture of thermoplastic containers by blow-moulding or stretch blow-moulding hot preforms, comprising a plurality of moulding devices distributed on the periphery of the carousel, in which each moulding device is designed as set forth above, with a cam fixedly mounted and cooperating with the cam follower rollers for driving the blowing nozzles of the blowing devices loaded on the rotating carousel.

BRIEF DESCRIPTION OF THE DRAWINGS

The invention will be better understood by reading the detailed description which follows of certain preferred embodiments given solely by way of non-limiting example. In this description, reference is made to the accompanying drawings in which.

DETAILED DESCRIPTION OF THE INVENTION

In the description which follows, the terms "upper" and "lower" are used to refer to the position of the device illustrated in the accompanying drawings, in order to facilitate comprehension, it being understood that, in the operational position of the device, the relevant parts or elements may no longer be "upper" or "lower".

Figure 1A:
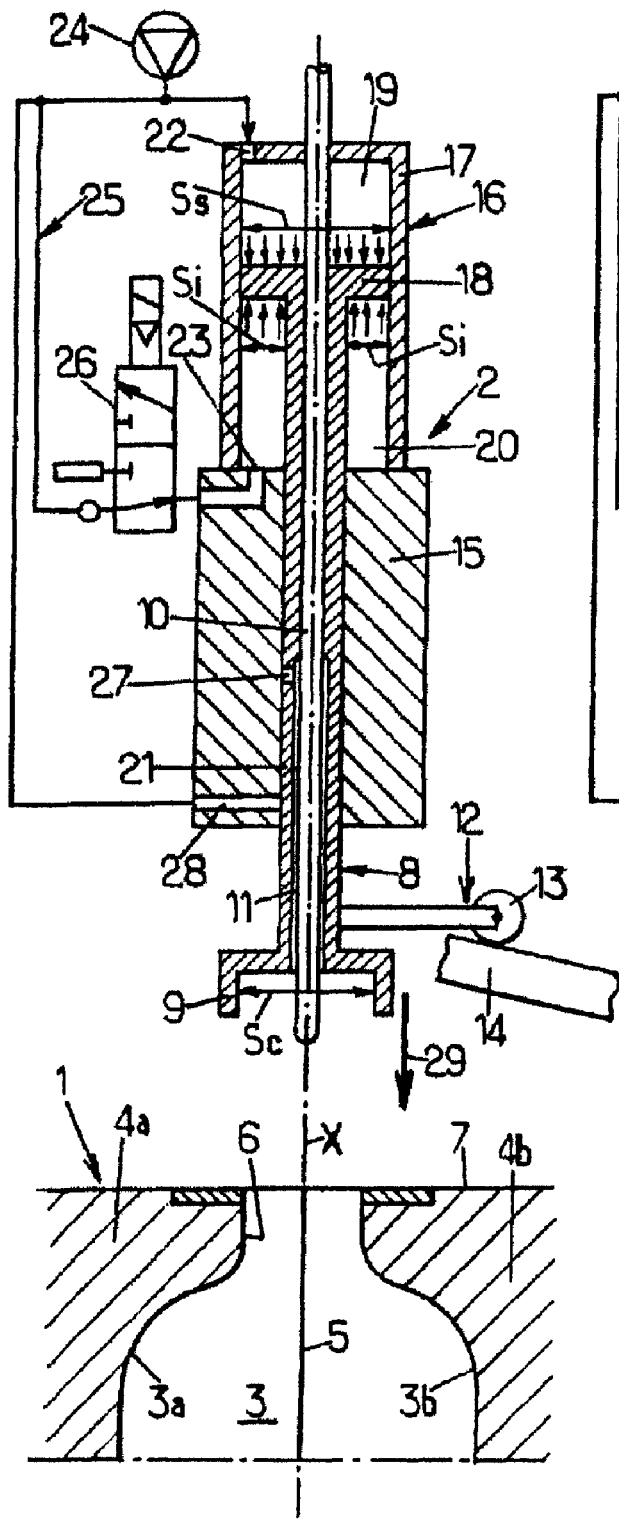
FIGS. 1A, 1B and 1C are schematic views illustrating a first embodiment of the invention, shown in three respectively different operational positions.
Figure 1B:
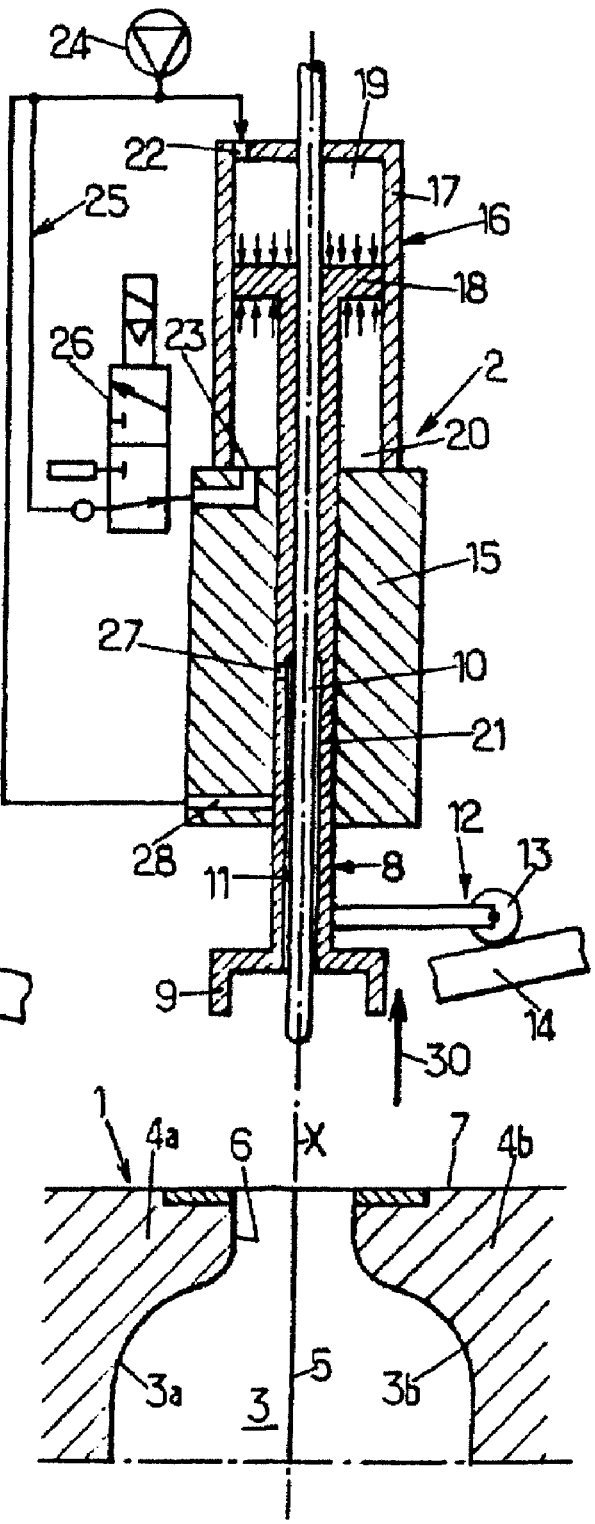
Figure 1C:
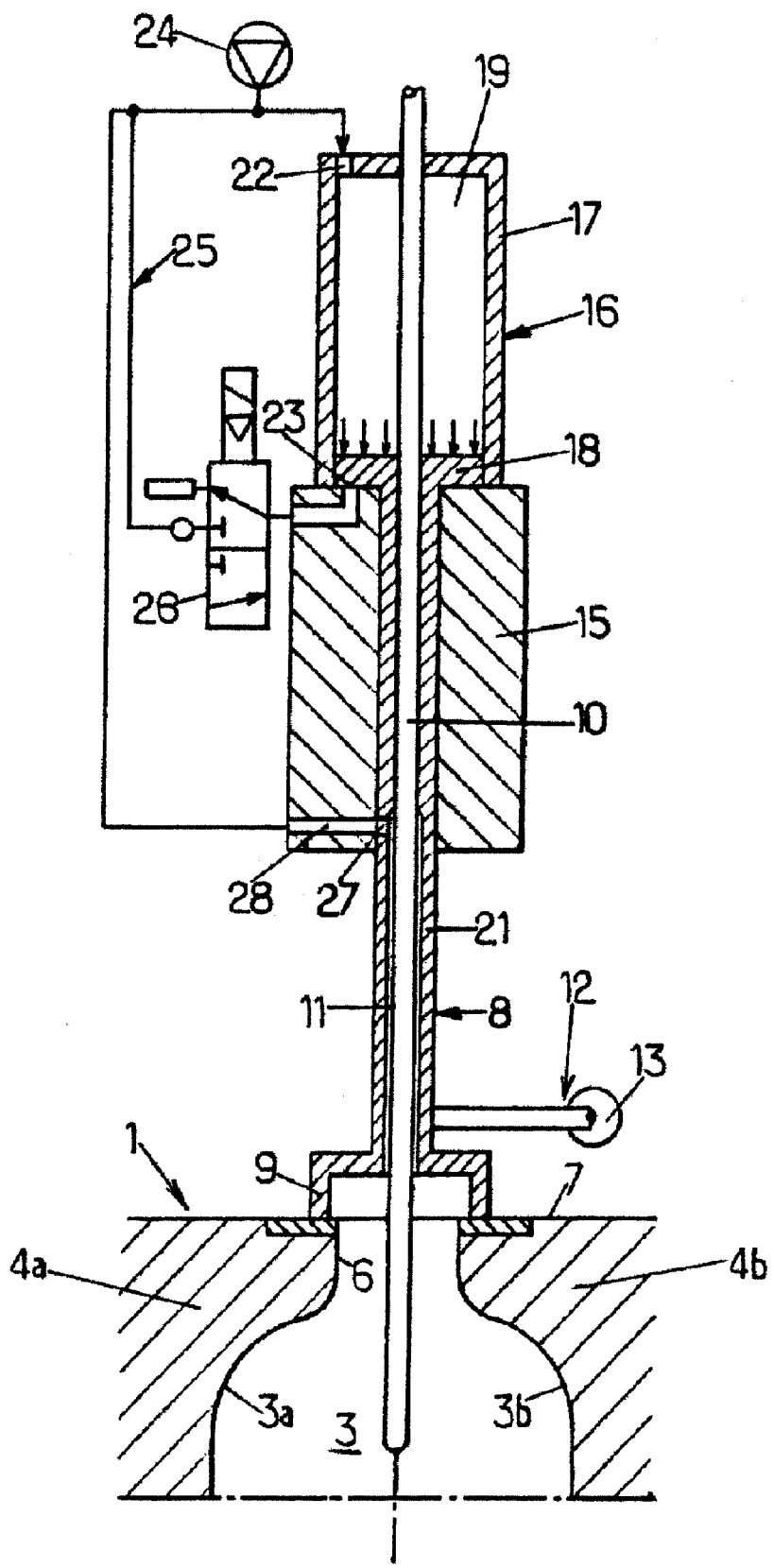

Illustrated in FIGS. 1A to 1C, schematically and partially, is a device for moulding thermoplastic containers by blow-moulding or stretch blow-moulding hot preforms targeted by the invention. In these figures, only the parts of the moulding device which are necessary for the understanding of the invention are shown; the other parts not related directly to the invention are not shown and may be of any type and of any appropriate configuration as regards the targeted applications.

By referring firstly more particularly to FIG. 1A, a device for moulding thermoplastic containers by blow-moulding or stretch blow-moulding hot preforms, comprises a mould 1 and blowing means 2.

The mould 1 shown in diametric section, comprises a container moulding cavity 3 having an axis X. In practice, as is the case for the majority of the moulding devices manufactured and marketed by the applicant, the mould may be of the type known as a jack-knife mould, consisting of two half-moulds 4a, 4b articulated in rotation one relative to the other about an axis of rotation which is substantially parallel to the axis X of the mould cavity; the half-moulds 4a, 4b comprise respective casts 3a, 3b which in the closed position of the mould 1 shown in FIG. 1A with the two half-moulds abutted to one another along a joint plane 5, together define the cavity 3. The cavity 3 opens out through an opening 6 (passage of the neck of the preform and the container), on one face 7 of the mould (typically the upper face of the mould).

The blowing means 2 comprise a blowing nozzle 8, of the bell-nozzle type which is arranged above the mould 1 substantially coaxially with the axis X of the mould cavity 3 and which is axially displaceable, by the action of driving means, in a hole 27 provided in a nozzle body 15 arranged above the mould 1. The axial displacement of the nozzle 8 is carried out sequentially between two extreme positions, namely:

a raised position in which the bell-shaped end 9 of the nozzle 8 is raised above the mould 1 so as to release the face 7 of the mould, so as to allow the loading of preforms in the mould before blow-moulding and the unloading of the moulded containers from the mould after blow-moulding, and a lowered position or blowing position (FIG. 1C) in which the bell-shaped end 9 of the nozzle 8 is in sealing abutment against the face 7 of the mould 1 so as to allow the introduction into the preforms of blowing fluid at high pressure (for example typically in the order of $40 \times 10^5$ Pa).

The nozzle 8 is generally in the form of a nozzle rod 21 of tubular shape which is terminated at the bottom by said bell-shaped end 9. For the supply of the nozzle rod with blowing fluid, the wall of the nozzle rod 21 is perforated by a hole 27 whilst the body 15 of the nozzle is perforated, preferably in the vicinity of lower end thereof, by a channel 28 connected to a source of blowing fluid, so that the hole 27 coincides with the channel 28 and that the nozzle rod 21 is supplied only when the nozzle 8 is in the blowing position and that the hole 27 no longer coincides with the channel 28 and that the supply of the nozzle rod 21 with blowing fluid is interrupted when the nozzle 8 is not in the blowing position.

As is the case in the majority of moulding devices which are manufactured and marketed by the applicant, the nozzle rod 21 is penetrated by a stretching rod 10 which is coaxially arranged with the axis X of the cavity and which, itself, is displaced axially in a sequential manner by displacement means (not shown) for axially stretching the hot preform in order to aid mechanically the pneumatic blow-moulding. In this configuration, the blowing air is supplied through an annular gap 11 existing between the stretching rod 10 and the internal face of the nozzle rod 21 in the lower part thereof.

The driving means of the nozzle 8 comprise mechanical driving means 12 including at least one cam follower roller 13 which is integral with the nozzle 8 and at least one respective control cam 14 against which said cam follower roller 13 is maintained in abutment, the cam follower roller 13 and the cam 14 being in relative movement. In practice, in a preferred implementation of such a moulding device, this relative movement is obtained by the fact that the moulding device forms part of an installation of the rotating carousel type comprising a plurality of identical moulding devices distributed peripherally on the carousel: it is therefore the cam follower rollers 13 which are in displacement and cooperate with a cam 14 which is integral with the frame of the carousel and which is fixed.

According to the invention, the driving means further comprise pneumatic driving means 16 which include, on the one hand, a fixed enclosure 17 surrounding substantially coaxially an upper terminal section of the nozzle rod 21 which is opposed to the bell-shaped end 9 and, on the other hand, a piston 18 enclosed in said enclosure 17 and integral with the upper end of the nozzle rod 21; this piston 18 is, in the example illustrated, perforated centrally to allow free access to the stretching rod 10.

The piston 18 defines in the enclosure 17 an upper chamber 19 and a lower chamber 20 of annular shape defined between the wall of the enclosure 17 and the nozzle rod 21.

The piston 18 has:
- an upper face having a surface area denoted by Ss which is greater than the surface area—denoted by Sc—of the bell 9 of the nozzle (in both cases, the relevant surface areas are the surface areas truncated by the surface area of the straight section of the stretching rod 10), and
- a lower face having a surface area denoted by Si (internal surface area of the lower chamber 20 which is truncated by the surface area of the straight section of the nozzle rod 21) which is less than said surface area Ss of upper face thereof.

In other words, the upper and lower faces of the piston 18 have different surface areas Ss and Si, the surface area Ss of the upper face of the piston being greater than the surface area Si of the lower face thereof.

In the embodiment shown in FIG. 1A, the piston 18 is adjusted, possibly sealingly, inside the enclosure 17, such that the diameter of the piston 18 is substantially equal to the internal diameter of the enclosure 17.

An upper orifice 22 is provided in the enclosure 17 and is in communication with the upper chamber 19, whilst a lower orifice 23 is provided in the enclosure 17 and is in communication with the lower chamber 20.

The two respective upper and lower orifices 22, 23 are connected to a source 24 of pressurized control fluid. A bypass circuit 25, connected respectively to the two orifices 22, 23, extends between the two upper and lower chambers 19, 20. In the illustrated example, the bypass circuit 25 is shown outside the enclosure 17, but such a bypass circuit could also be designed to be incorporated in the enclosure 17 and/or the piston 18 as will be explained below.

It is also necessary that the lower orifice 23 is separated from and connected to the atmosphere during the blow-moulding phase; then only the upper orifice 22 remains connected to the source of control fluid 24. A simple embodiment for such an implementation consists in that the lower orifice 23 is connected to the source of control fluid 24, and thus to the upper orifice 22 due to the arrangement maintained, by means of pneumatically operated selector means 26 advantageously consisting of a solenoid valve, for example a 2 way/2 position solenoid valve, as shown.

The surface area Ss of the upper face of the piston 18 is such that the force exerted on the piston by the control fluid in the upper chamber 19 is greater than the force in the reverse direction exerted by the blow-moulding fluid on the bell 9 of the nozzle 8.

In the embodiment, more specifically illustrated in FIGS. 1A to 1C, the source 24 of control fluid is constituted simply by the source of blowing fluid itself. In these conditions, the two upper and lower orifices are connected to the source of blowing fluid, directly for the upper orifice 22 and by means of the pneumatically operated switch for the lower orifice 23. The upper face of the piston 18 has a transverse dimension which is greater than the transverse dimension of the bell 9 of the nozzle 8.

The operation of the device is as follows.

During the lowering phase (arrow 29) of the nozzle 8 illustrated in FIG. 1A, the solenoid valve 26 is arranged in the open position such that the lower chamber 20 is in communication with the source of blowing fluid and with the upper chamber 19. Due to the distance between the surface areas Ss and Si of the upper and lower faces, respectively, of the piston 18, the piston 18 is pushed back downwards (in FIG. 1A) whilst the fluid present in the lower chamber 20 is forced back through the lower orifice 23 and the solenoid valve 26 in the direction of the source 24. During this time, the cam follower roller 13 is maintained in constant abutment against the cam 14 which continually determines the profile (the momentary speed and the variation in speed) of the lowering speed of the nozzle 8.

During the lifting phase (arrow 30) of the nozzle 8 illustrated in FIG. 1B, the solenoid valve 26 is always arranged in the open position such that the lower chamber 20 remains in communication with the source of blowing fluid and with the upper chamber 19. By the action of the cam follower roller 13 cooperating with the cam 14, the nozzle 8, integral with the cam 13, is driven mechanically in the lifting direction. During this displacement, the fluid present in the upper chamber 19 is forced back through the upper orifice 22 whilst the fluid is drawn into the lower chamber 20 through the solenoid valve 26 and the lower orifice 23.

Thus, during the displacement of the nozzle 8, the control fluid circulates in a closed bypass circuit and there is no substantial loss of fluid.

When the nozzle is in its lowered blow-moulding position in abutment against the face 7 of the mould 1 as illustrated in FIG. 1C, the piston 18 is completely lowered into the enclosure 17 such that the lower chamber 20 has a volume of substantially zero whilst the upper chamber 19 has a maximum volume. The cooperation between the cam follower roller 13 and the cam 14 is inactive. In this position, the solenoid valve 26 is switched into the closed position in which the connection between the lower orifice 23 and the source 24 of fluid is interrupted and the lower orifice 23 is connected to the atmosphere as illustrated in FIG. 1C. In this configuration, no force is exerted on the lower face of the piston whilst the upper face thereof is subjected to the pressure of the control fluid, in this case the blowing fluid. As the hole 27 is thus aligned with the channel 28, the blowing fluid is moved into the nozzle and into the preform to be blow-moulded. The bell 9, subjected to the pressure of the blowing fluid, is subjected to a force which tends to lift it from abutment against the mould, which force, however, remains less than that exerted on the upper face of the piston due to the difference between the surface areas present and due to the fact that no fluid is able to be admitted into the lower chamber 20. In these conditions, the nozzle 8 is pneumatically locked in its blowing position in abutment against the face 7 of the mould 1.

Due to the arrangement according to the invention, it is the mechanical driving means 12 with the cam follower roller 13 in abutment against the cam 14 which determine the speed of displacement of the nozzle, whilst the pneumatic driving means 16 ensure the maintenance of the cam follower roller 13 in abutment against the cam during the displacement to lower the nozzle 8 and the locking of the nozzle 8 in abutment against the mould 1 during the blow-moulding phase.

Still referring to the configuration proposed by the invention, the length of the connection between the lower orifice 23 and the solenoid valve 26 may be very short, such that the volume of pressurized fluid which is isolated there during the switching-over of the solenoid valve at the moment of blowing is discharged to the atmosphere and may be very minimal. Combined with the fact that the control fluid forced back from the upper/lower chambers during the displacements of the nozzle 8 is not lost, but circulates in a closed circuit, the means implemented within the scope of the invention provide substantial savings in the control fluid volume, which is translated into compressor means which are able to be less powerful and thus less costly to purchase and also into a reduced consumption of electricity during operation. These advantages are very remarkable in the configuration of the embodiment which is more specifically conceived here, where the control fluid is none other than the blowing fluid at high pressure which is costly to produce.

In the installations for manufacturing thermoplastic containers by blow-moulding or stretch blow-moulding hot preforms, comprising a plurality of moulding devices of which the number may rise to approximately forty or more, the cost of producing pressurized fluids, and in particular the blowing fluid at high pressure, represents a significant proportion of the costs of operating these installations. To attempt to implement savings at this stage, it proves desirable to reduce as far as possible the consumption of blowing fluid.

To this end, a saving in pressurized blowing fluid may be obtained, in the arrangement according to the invention which has been set forth above, by providing, for the pneumatic control of the displacement of the nozzle 8, the possibility of using a source of fluid which is different from the source of blowing fluid, and is preferably a source of fluid at substantially lower pressure.

Figure 2:
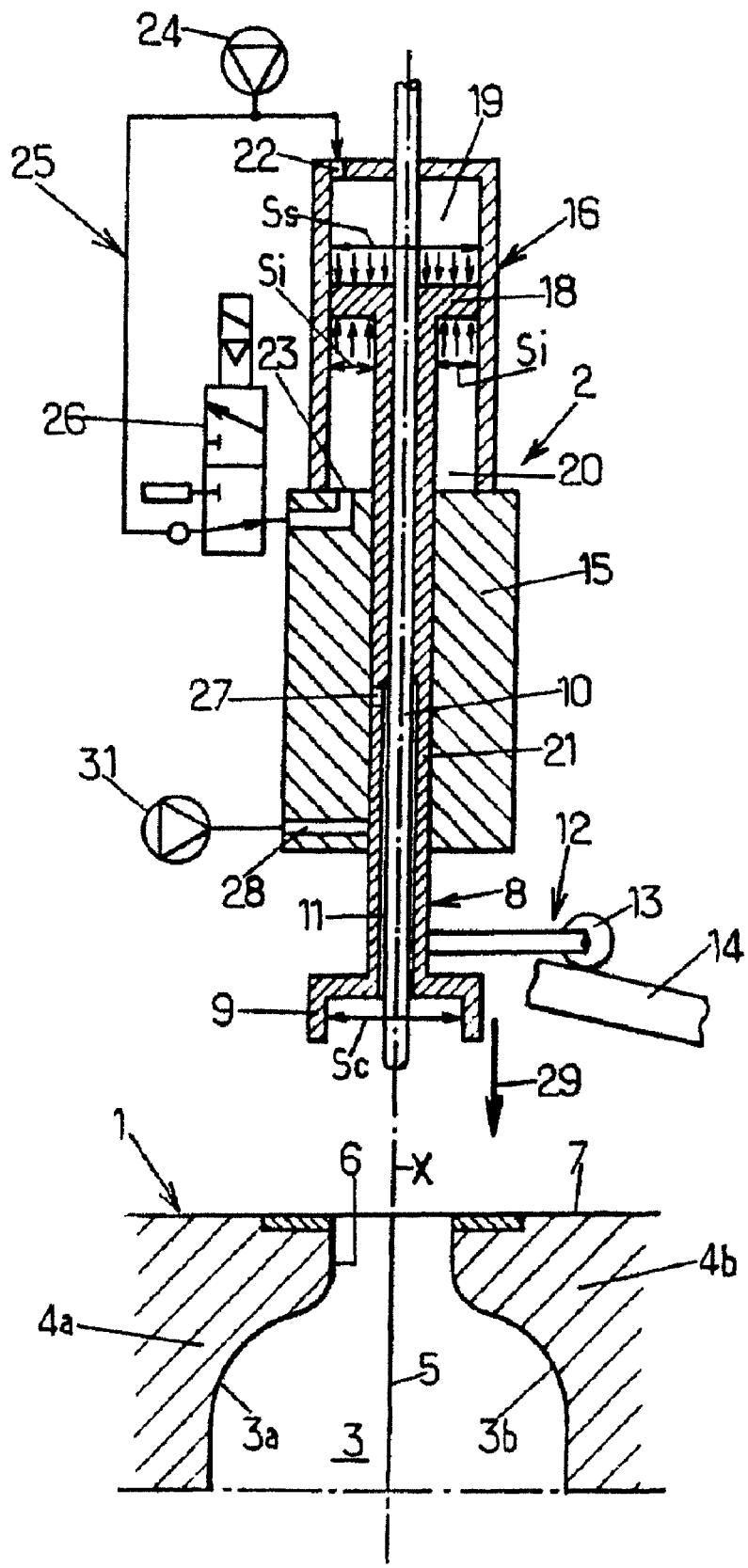
FIG. 2 is a schematic view illustrating a second embodiment of the invention, shown in a single operational position which is identical to that of FIG. 1A.

Thus, by way of a preferred variant as regards savings in the operation of the device, in the embodiment illustrated in FIG. 2 (operational position identical to that of FIG. 1A), the source 24 of control fluid is a source of fluid at low pressure, advantageously fluid at industrial pressure (typically in the order of $7 \times 10^5$ Pa) which is present in all the pneumatic installations to ensure various controls, whilst the source 31 of blowing fluid is only connected to a single channel 28. It is thus appropriate that the surface area of the upper face of the piston is determined in accordance with the pressure of the control fluid, so that the force exerted on this face is greater than the opposing force exerted on the bell 9 of the nozzle 8 by the blowing fluid at high pressure during blow-moulding step. As for the remainder, the structure and the operation of the embodiment of FIG. 2 remain identical to that which has been disclosed above in relation to FIGS. 1A to 1C.

Figure 3:
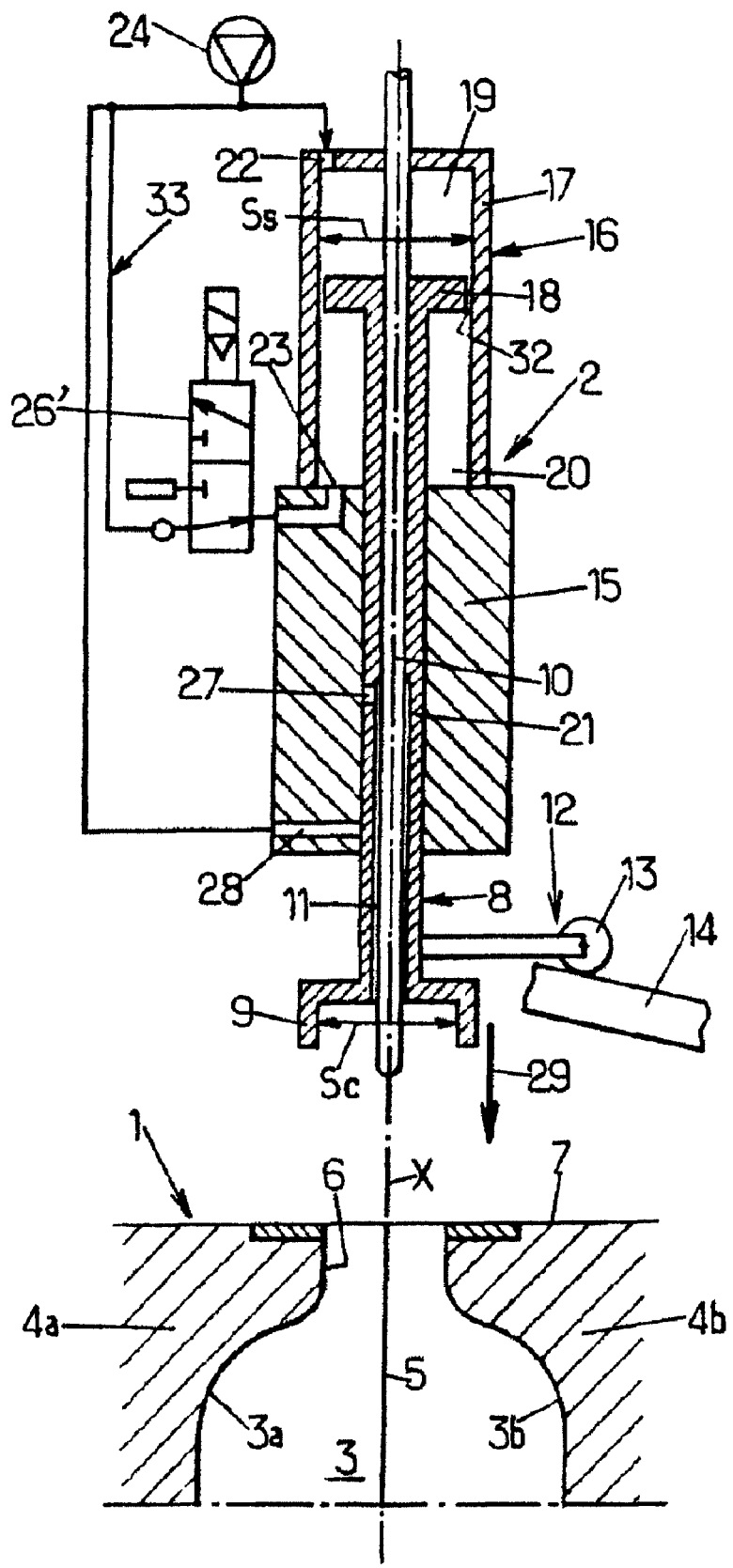
FIG. 3 is a schematic view illustrating a third embodiment, which is preferred of the invention shown in a single operational position which is identical to that of FIG. 1A.

In FIG. 3 is illustrated schematically a further embodiment according to the invention, which is preferred due to the simplification and the reductions in cost which result. This arrangement consists in that the fluid exchanged between the two upper and lower chambers 19, 20 circulates inside the enclosure 17. In the arrangement illustrated by way of example in FIG. 3, the piston 18 has a diameter which is less than the internal diameter of the enclosure 17, such that during the displacement of the piston 18 inside the enclosure 17, the fluid exchanged between the upper and lower chambers 19, 20 no longer circulates via the bypass circuit 25 (as shown in FIGS. 1 and 2) but via the annular gap 32 existing between the periphery of the piston 18 and the wall of the enclosure 17. It could also be envisaged to implement a piston which might have the same diameter as the internal diameter of the enclosure, but which would be perforated by one or more through-passages allowing the two chambers to communicate. However, a circuit 33 including pneumatically operated selector means 26', typically in the form of a solenoid valve, has to be kept in place between the source 24 of fluid and the channel 23 so that during the lifting of the piston from its extreme bottom position, pressurized fluid may be applied to the lower face of the piston 18 and to avoid the effect of aspiration which would otherwise be produced with, as a result, a driving force which is too great in contact with the cam follower roller 13 and the control cam 14. In this case, however, as the solenoid valve 26' only has to transmit a very small flow, it may be of very small dimensions and thus less expensive. To illustrate better the absence of circulation, via the circuit 33, of the fluid exchanged between the upper and lower chambers 19, 20, the orifice 22 of the enclosure 17 and the circuit 33 are shown, in FIG. 3, connected separately to the source 14 of pressurized fluid.

What is claimed is:

1. Device for moulding thermoplastic containers by blow-moulding or stretch blow-moulding hot preforms, said device comprising a mould and blowing means comprising a blowing nozzle of the bell-nozzle type which is axially displaceable and driving means for displacing said blowing nozzle above said mould between a raised position in which the end of the nozzle is raised above the mould and a blowing position in which the end of the nozzle is in sealing abutment against the mould, which driving means comprise mechanical driving means including at least one cam follower roller integral with the nozzle, and at least one respective control cam against which said cam follower roller is maintained in abutment, the cam follower roller and the cam being in relative movement, wherein said driving means further comprise pneumatic driving means which include:
a fixed enclosure surrounding substantially coaxially an upper terminal section of the blowing nozzle,
a piston enclosed in said enclosure and integral with the upper end of the blowing nozzle, said piston defining in the enclosure an upper chamber and a lower chamber, the piston having an upper face of which the surface area is greater than the surface area of the bell of the nozzle and a lower face having a surface area which is less than the surface area of its upper face,
an upper orifice provided in the enclosure and in communication with the upper chamber,
a lower orifice provided in the enclosure and in communication with said lower chamber,
said upper and lower orifices being connected to a source of pressurized control fluid,
a bypass circuit extending between said upper and lower chambers, and
selector means capable of separating said lower orifice from, and connecting said lower orifice to, the atmosphere during the blow-moulding phase,
the surface area of the upper face of the piston being such that the force exerted on the piston by the control fluid is greater than the force in the reverse direction exerted by the blowing fluid on the bell of the nozzle, whereby it is the mechanical driving means with the cam follower roller in abutment against the cam which determine the speed of displacement of the nozzle, whilst the pneumatic driving means ensure the maintenance of the cam follower roller in abutment against the cam during the displacement of the nozzle and the locking of the nozzle in abutment against the mould during the blow-moulding phase, and whereby it also becomes possible that the pressurized fluid controlling the operation of the pneumatic driving means is not systematically discharged into the atmosphere and that the dead volumes may be reduced, making possible substantial savings in pressurized blowing fluid.

2. Moulding device according to claim 1, wherein said upper and lower orifices are connected to the source of blowing fluid and wherein said upper face of the piston has a transverse dimension which is greater than the transverse dimension of the bell of the nozzle.

3. Moulding device according to claim 1, wherein said upper and lower orifices are connected to a source of control fluid at a pressure which is lower than the pressure of the blowing fluid.

4. Moulding device according to claim 3, wherein said source of control fluid is a source of fluid at industrial pressure.

5. Moulding device according to claim 1, wherein said bypass circuit is outside the enclosure and incorporates a solenoid valve which is placed in the closed position during the blow-moulding phase.

6. Moulding device according to claim 1, wherein said bypass circuit is inside the enclosure, and in particular extends between the enclosure and the piston, and wherein a circuit incorporating a solenoid valve is interposed between the source of control fluid and the lower orifice.

7. Installation of the rotating carousel type for the manufacture of thermoplastic containers by blow-moulding or stretch blow-moulding hot preforms, comprising a plurality of moulding devices distributed on the periphery of the carousel, wherein each moulding device is designed according to claim 1.

* * * * *